United States Patent
Liu

(10) Patent No.: US 6,665,002 B2
(45) Date of Patent: Dec. 16, 2003

(54) REAL-TIME VIDEO/AUDIO QUALITY ADJUSTMENT METHOD

(75) Inventor: Meng-Hsien Liu, Taoyuan (TW)

(73) Assignee: Leadtek Research Inc., Taipei Hsien (TW)

( * ) Notice: Subject to any disclaimer, the term of this patent is extended or adjusted under 35 U.S.C. 154(b) by 205 days.

(21) Appl. No.: 09/940,350

(22) Filed: Aug. 27, 2001

(65) Prior Publication Data

US 2002/0167586 A1 Nov. 14, 2002

Related U.S. Application Data

(60) Provisional application No. 60/290,472, filed on May 11, 2001.

(51) Int. Cl.⁷ .................................................. H04N 7/14
(52) U.S. Cl. .............................. 348/14.12; 379/93.08; 370/468; 375/240.12
(58) Field of Search ........................ 348/14.12, 14.13, 348/14.08, 14.01; 379/93.01, 93.08, 93.17; 370/468, 352, 465, 477, 230, 231, 232, 235; 375/240, 240.02, 240.12

(56) References Cited

U.S. PATENT DOCUMENTS 6,014,694 A * 1/2000 Aharoni et al. ............. 370/468
6,373,855 B1 * 4/2002 Downing et al. ........... 370/468
6,480,541 B1 * 11/2002 Girod et al. ........... 375/240.12

* cited by examiner

Primary Examiner—Wing Chan
(74) Attorney, Agent, or Firm—J.C. Patents

(57) ABSTRACT

A method for transmitting audio and visual data over a communication means. If the bandwidth over a communication means drops below a predetermined level a video conference system can begin transmitting visual data in a QCIF format, another system receiving the data and scaling the data from the QCIF format to a CIF format. In another embodiment of the invention if the bandwidth drops below a first or second predetermined level the audio format can be altered to lower the bandwidth requirements accordingly. In a third embodiment the methods for lowering the utilized bandwidth of the audio and visual data can be used in conjunction with each other.

14 Claims, 3 Drawing Sheets

REAL-TIME VIDEO/AUDIO QUALITY ADJUSTMENT METHOD

CROSS-REFERENCE TO RELATED APPLICATION

This application claims the priority benefit of U.S.A. provisional application Ser. No. 60/290,472, filed May 11, 2001.

FIELD OF THE INVENTION

The present invention relates to methods for transmitting and receiving audio/visual data. More specifically, the invention relates to methods for a video conference system to transmit and receive audio/visual data during periods of reduced bandwidth.

BACKGROUND OF INVENTION

The present invention relates to an improved method for transmitting audio/visual data particularly for video conference systems. Video conference systems are becoming increasingly important for long distance communication. With the use of a video conference system participants can see and talk to each other over a system of two or more individual units each consisting of a viewing device, a speaker, a microphone, and a video camera. The signals are transmitted over a communications means such as telephone lines, cable, satellite etc. with many current video conference systems utilizing the internet for transmission of the video and audio data. The International Telecommunications Union (ITU) has established the H.323 standard (version 2, dated January 1998) for computers, equipment, and services for multimedia communications over networks allowing users to connect over the internet using different products that support H.323. H.323 systems can carry real-time video, audio, and data, or any combination of these elements. The H.323 standard defines how the audio and video information is formatted and packaged for transmission over the network. Standard audio and video codecs encode and decode input/output analog data from the audio and visual sources into digital data for transmission over the communication means.

A significant difficulty in transmitting audio and especially video is a lack of bandwidth, and problems with latency. Bandwidth is the measurement of the capacity to deliver information in bits per second and is crucial when precise amounts of information must be provided within a certain amount of time. Bandwidth problems can be caused by the equipment, media, and the internet infrastructure. In a video conference application where the flows of audio and video data are constant it is crucial that the system has enough bandwidth for transmitting the data. For example digitized phone-quality speech (8-bit sample, 8000 samples per second) requires approx. 64 Kbps of data. Full motion video for a 1024×768 pixel display, with 3 colors at 8 bits each, displayed at 30 frames per second, equates to approx. 566,000 Kbps of throughput. In a conventional system when the transmission bandwidth lowers during transmission, the system will drop video frames, to maintain the video stream over the new lower bandwidth. This method though is very problematic though, as the received video appears very jerky. Therefore a need exists for sending audio-video data during a drop in available bandwidth during transmission without substantially affecting the video quality.

SUMMARY OF THE INVENTION

It is an object of the invention to provide a method for improving the visual and audio signals transferred during a reduced bandwidth period. A video conference system transfers audio and visual data over a communications means which in a preferred embodiment is the internet. When the available bandwidth drops during the transfer of data (when a conference is in progress) the video conference system will start transmitting and receiving data in a QCIF format rather than a CIF format to prevent the dropping of frames, while maintaining video continuity and quality. The video conference units will receive the visual data in the QCIF format and rescale it back into a CIF format for viewing. In another embodiment of the invention if the bandwidth drops the audio format can be changed according to the amount of bandwidth available. In yet another embodiment of the invention a user can select preferences and according to the methods shown by the invention the audio quality can be reduced while preserving video quality, or opposingly video can be sent in a QCIF format in order to preserve audio quality.

These and other features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

In the following detailed description of the preferred embodiments, reference is made to the accompanying drawings which form a part hereof, and in which is shown by way of illustration specific preferred embodiments in which the invention may be practiced. The preferred embodiments are described in sufficient detail to enable these skilled in the art to practice the invention, and it is to be understood that other embodiments may be utilized and that logical, changes may be made without departing from the spirit and scope of the present invention. The following detailed description is, therefore, not to be taken in a limiting sense, and the scope of the present invention is defined only be the appended claims.

Figure 1:
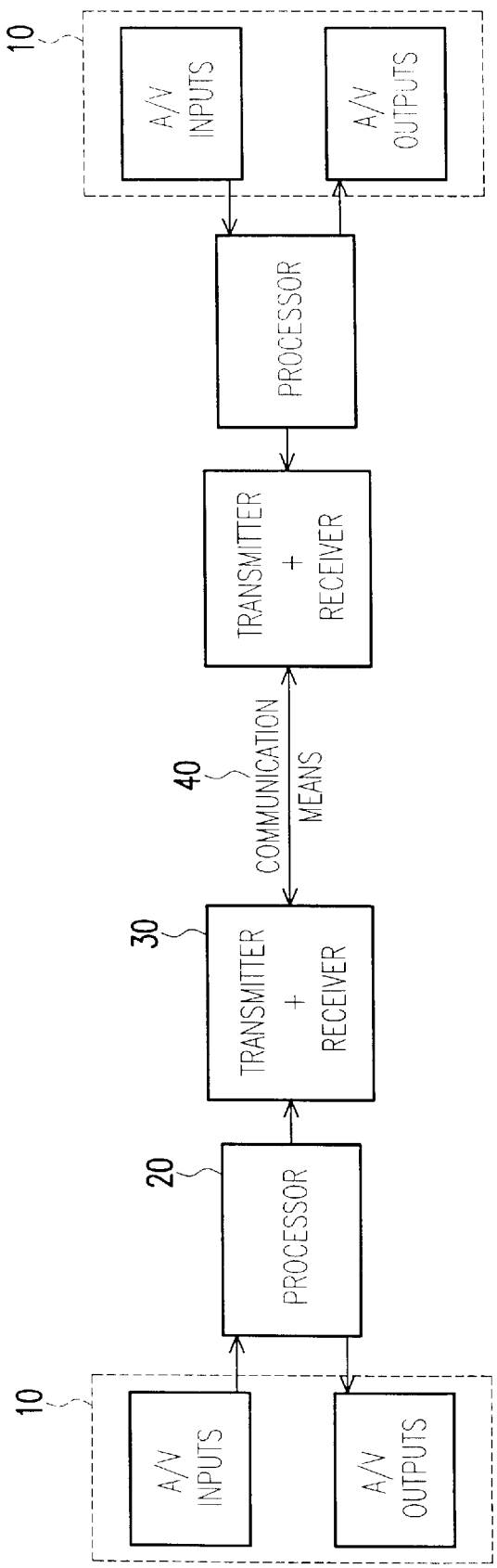
FIG. 1 shows a typical video conference apparatus

FIG. 1 shows a typical apparatus for the invention. A processor 20 is connected to audio-visual inputs and outputs 10. Typically the visual output is a LCD screen, computer monitor, or a standard television. The audio output can be a speaker. The visual input can be a video camera, and the audio input can be a microphone. The processor 20 converts the signals from the inputs into signals to be transferred over the communication means by the transmitter 30. The communication means 40 can include standard PSTN lines, radio communications, cable and so forth. A receiver 30 forwards the received signals to the processor 20 where the digital signals are converted into signals for the A/V outputs 10. A personal computer can realize the functions of the video conference system with the appropriate hardware. The system be further utilized as a multipoint system which in combination with a Multipoint Control Unit (MCU) allow 3 or more H.323 terminals to connect and participate in a conference.

ITU standard H.261 defines video codecs for audiovisual services at P×64 Kbps HTML. H.261 defines two picture formats known as Common Intermediate Format (CIF), and Quarter Common Intermediate Format (QCIF). CIF supports a picture resolution of 352×288 pixels/frame while QCIF provides a resolution of 176×144 pixels/frame (one quarter provided by CIF). QCIF/CIF images are coded using the YCbCr color encoding scheme (Y=luma, Cb/Cr= chrominance color encoding scheme). This method takes advantage of the fact that the human eye is less sensitive to variations in color than intensity. This allows the chrominance components (Cb/Cr) to be encoded at half the bandwidth of the luminance (Y) and still retain some level of color quality.

The invention provides a method for transmitting video and audio data during periods of low bandwidth availability. The system can monitor the bandwidth at the connection, and also has the ability to monitor the bandwidth using the RTP (Real Time Transport Protocol) and RTCP (Real Time Transport Control Protocol) to determine the status of the network traffic. For example if complete RTP packets and complete RTCP packets are not being received then it can be deduced that the bandwidth is not adequate. Alternatively if RTCP packets are received with no frames lost, but RTP packets are lost, then we can adjust video or audio codec to reduce the required bandwidth. If RTP packets are received with no frames lost, but RTCP packets are lost, we still can treat it as acceptable bandwidth because there is no video or audio frames lost. Once the RTP packets and RTCP packets are received with no frames lost, we know the bandwidth is adequate, we can decide to adjust the video and audio codec to get better quality, then bandwidth can be determined to be available, and the appropriate actions can be taken by the system.

In a preferred embodiment of the invention if the amount of bandwidth available drops when a conference is in progress, the video conference system (composed of two or more individual units) will transmit and receive video data in the QCIF format rather than the CIF format. Each video conference unit can independently start transmitting QCIF when the bandwidth drops below a defined level. Alternatively during transmission the video conferences units can negotiate or request to begin transmitting and receiving video data in the QCIF format simultaneously.

Figure 2:
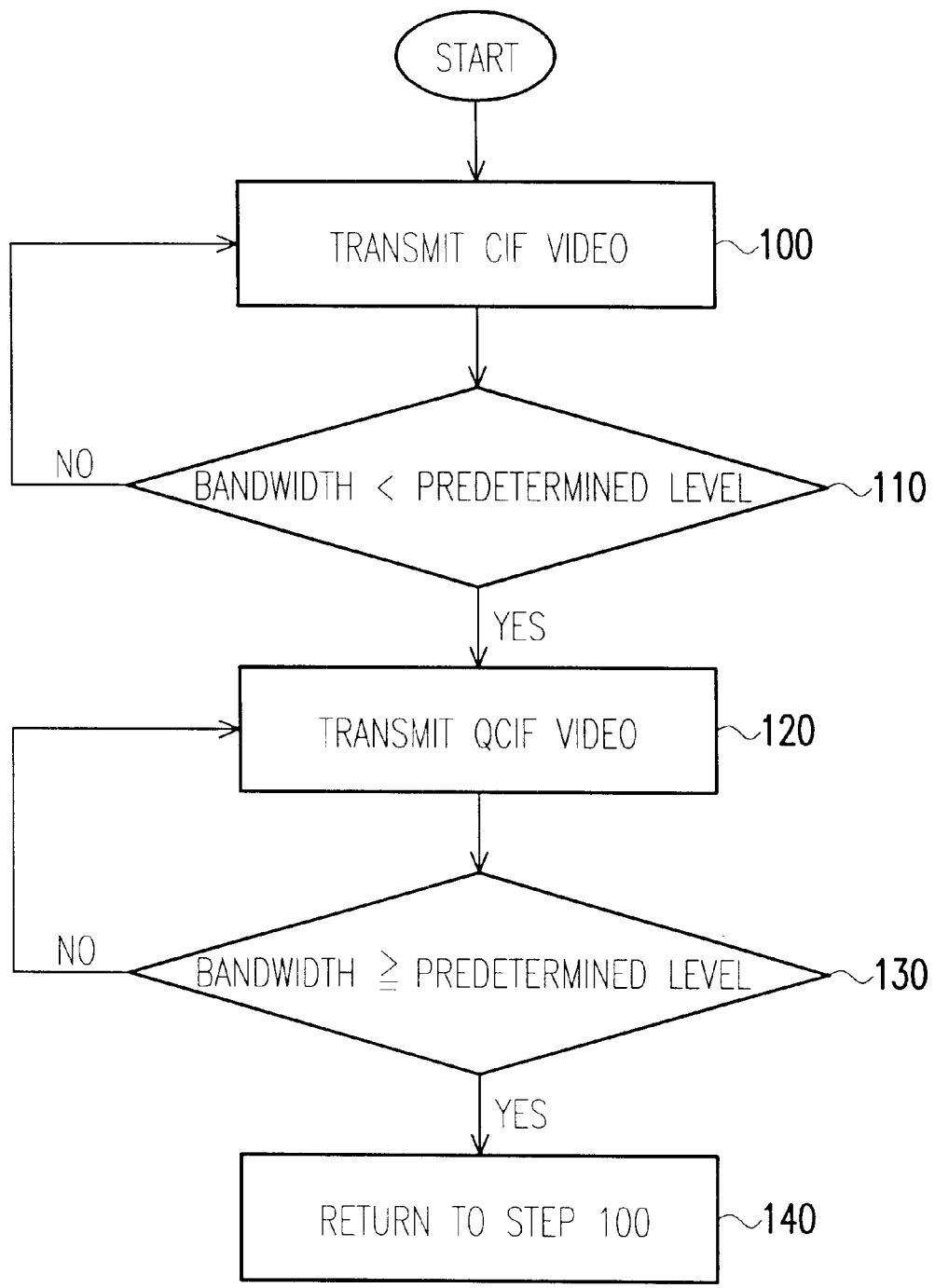
FIG. 2 shows a flowchart exemplifying an embodiment of the invention

In order to transmit the visual data in the QCIF format the processor can directly convert the input signals from the A/V inputs 10 into a QCIF format. In another embodiment the processor can compress data in the CIF format so as to conform to the QCIF format. A unit can then receive the QCIF formatted data and scale the picture back into a CIF format for display. FIG. 2 shows a flowchart exemplifying this method. Typically an audio-visual system will begin transmitting in a CIF format in step 100. If during transmission the bandwidth drops below a predetermined level (step 110) the system can begin transmitting QCIF and likewise the receiving station will begin receiving the QCIF signal and scaling it to a CIF format again (step 120). If the bandwidth increases at a later time the system can begin transmitting the visual data in the CIF format again (step 140).

Figure 3:
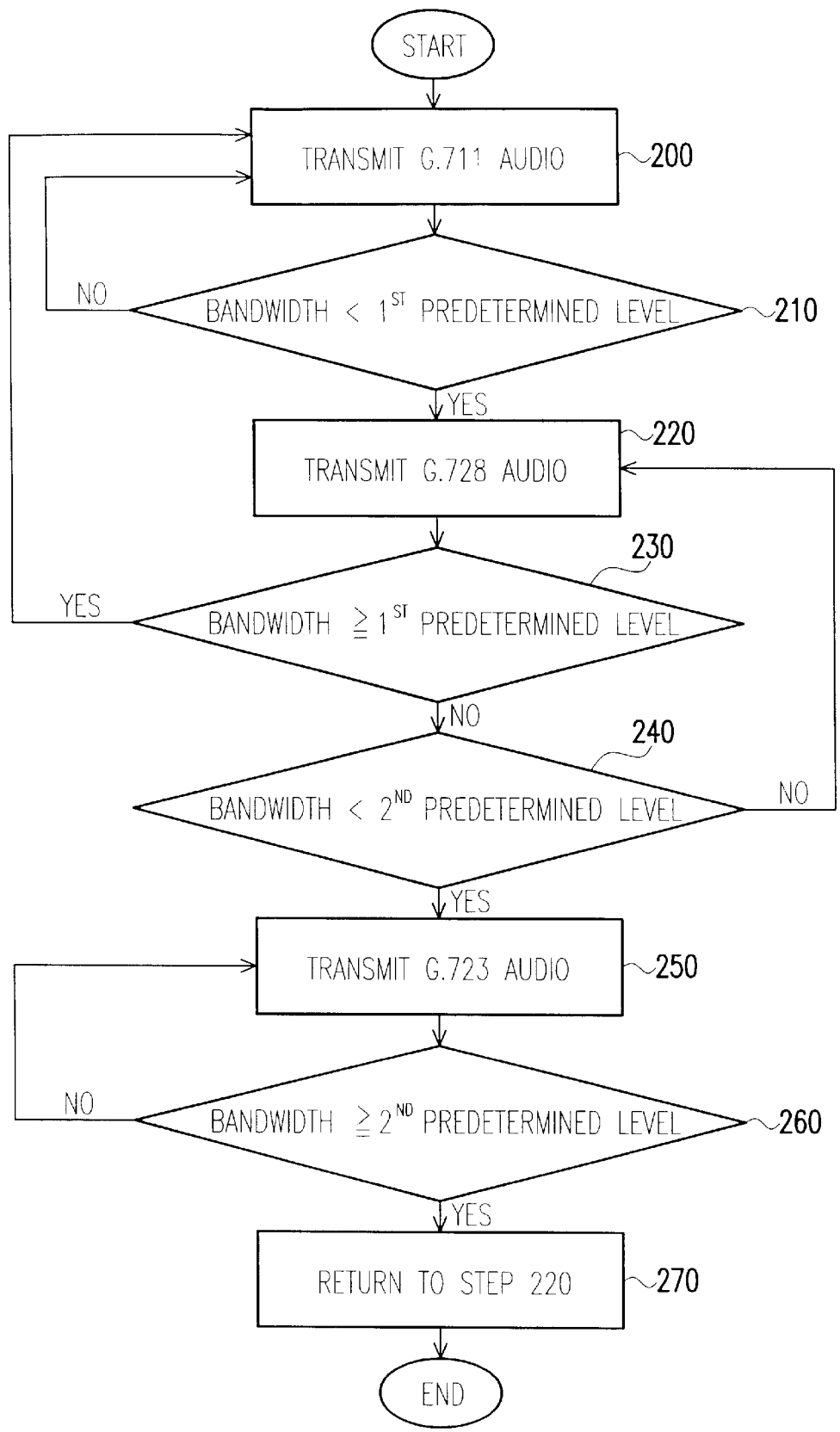
FIG. 3 shows a flowchart exemplifying another embodiment of the invention

In another embodiment of the invention if a drop in bandwidth occurs the audio format can be altered. Typically an audio-visual system will use a codec such as G.711 that transmits 48, 56, or 64 kilobits per second (Kbps). However if the bandwidth drops during transmission the system can use a different lower bandwidth codec such as G.728 (16 Kbps), or G.723 (5.3 or 6.3 Kbps). This method allows the system to operate during low bandwidth conditions. As shown in the flowchart in FIG. 3, the system begins transmitting audio data using the G.711 codec in step 200. If the bandwidth drops below a first predetermined level during transmission the system can begin transmitting G.728 in step 220. If the bandwidth increases the system can being transmitting G.711 audio again. If however the bandwidth drops even further below a second predetermined level (step 240) the system will begin transmitting G.723 audio in step 250. If the available bandwidth increases above the second predetermined level the system will go to step 220 and begin transmitting G.728 audio again (steps 260 & 270).

In another embodiment of the invention according to a users preferences the audio format can be altered to reduce the required bandwidth to preserve video quality according to the methods shown. Opposingly the video data bandwidth can be reduced by switching to the QCIF format from the CIF format in order to preserve audio quality according to the methods shown. Also both the audio and video data bandwidths can be reduced to keep both signals at an adequate level. For example if a drop in bandwidth is detected the audio format can be changed to G.728. If there is still a lack of available of bandwidth the visual data format can be changed to QCIF in order to prevent the audio format from having to change to G.723. With this method a compromise can be achieved between audio and visual data quality to keep both at adeqate levels.

Various additional modifications may be made to the illustrated embodiments without departing from the spirit and scope of the invention. Therefore, the invention lies in the claims hereinafter appended.

What is claimed is:

1. A method of transmitting audio/visual data comprising the steps of:
    monitoring the available bandwidth on a communications means during data transmission;
    transmitting visual data in CIF format if the bandwidth is equal to or greater than a first predetermined level;
    transmitting visual data in QCIF format when the arailable bandwidth drops below a predetermined level;
    receiving the visual data in QCIF format and scaling the visual data back into a CIF format.

2. The method of claim 1, wherein CIF format data is scaled down to QCIF format before transmission.

3. The method of claim 1, which further includes the step of communicating with the other video conference units so as to begin transmission of the QCIF format simultaneously.

4. The method of claim 1, wherein the date is transmitted over the internet according to H.323 standards.

5. A method of transmitting audio/visual data comprising the steps of:
    monitoring the available bandwidth on a communications means during data transmission;
    transmitting audio data in G.711 format if the bandwidth is equal to or greater than a first predetermined level;
    transmitting audio data in G.728 format if the bandwidth drops below a first predetermined level;
    transmitting audio data in G.723 format if the bandwidth drops below a second predetermined level.

6. The method of claim 5, wherein the data is transmitted over the internet according to H.323 standards.

7. The method of claim 5, which further includes the step of communicating with the other video conference units so as to begin transmission of a specified audio format simultaneously.

8. A method of transmitting audio/visual data comprising the steps of:
- monitoring the available bandwidth on a communications means during data transmission;
- transmitting audio data in a first format if the bandwidth is equal to or greater than a first predetermined level;
- transmitting audio data in a second format if the bandwidth drops below a first predetermined level; and
- transmitting audio data in a third format if the bandwidth drops below a second predetermined level.

9. The method of claim 8, wherein the date is transmitted over the internet according to H.323 standards.

10. The method of claim 8, which further includes the step of communicating with the other video conference units so as to begin transmission of a specified audio format simultaneously.

11. A method of transmitting audio/visual data, comprising the steps of:
- detecting a drop in bandwidth data transmission; and
- lowering the amount of bandwidth utilized by the audio data in order to preserve video quality;
- wherein lowering the amount of bandwidth utilized by the audio data comprises the steps of:
  - monitoring the available bandwidth on a communications means during data transmission;
  - transmitting audio data in G.711 format if the bandwidth is equal to or greater than a first predetermined level;
  - transmitting audio data in G.728 format if the bandwidth drops below a first predetermined level;
  - transmitting audio data in G.723 format if the bandwidth drops below a second predetermined level.

12. A method of transmitting audio/visual data comprising the steps of:
- monitoring the available bandwidth on a communications means during data transmission;
- transmitting visual data in a first format if the bandwidth is equal to or greater than a first predetermined level;
- transmitting visual data in a second format with a reduced bandwidth when the available bandwidth drops below a predetermined level; and
- receiving the visual data the second format and scaling the visual data back into the first format.

13. The method of claim 12, which further includes the step of communicating with the other video conference units so as to begin transmission of a visual data format simultaneously.

14. The method of claim 12, wherein the data is transmitted over the internet according to H.323 standards.

* * * * *